J. RICHARDS & J. MEEHL.

Spark-Arresters.

No. 5,729. Reissued Jan. 13, 1874.

Witnesses, Wm. A. Steel
Thomas McIlvain

Jackson Richards
and Jacob Meehl
by their Attys.
Howson and Sons.

AM. PHOTO-LITHOGRAPHIC Co. N.Y. (OSBORNE'S PROCESS.)

UNITED STATES PATENT OFFICE.

JACKSON RICHARDS AND JACOB MEEHL, OF PHILADELPHIA, PA.

IMPROVEMENT IN SPARK-ARRESTERS.

Specification forming part of Letters Patent No. 143,931, dated October 21, 1873; reissue No. 5,729, dated January 13, 1874; application filed November 21, 1873.

*To all whom it may concern:*

Be it known that we, JACKSON RICHARDS and JACOB MEEHL, of Philadelphia, county of Philadelphia, State of Pennsylvania, have invented certain Improvements in Locomotive-Chimneys, of which the following is a specification:

Our invention relates to the smoke-stacks or chimneys of locomotive and other boilers, in which the exhaust steam from the engine is employed to increase the draft; and the object of our invention is to prevent the withdrawal of large masses of ignited fuel from the fire-place, and to effectually dispose of such sparks as find their way into the chimney, objects which we attain by the combination, in the chimney, of an obstruction, substantially as described hereafter, with a screen, which disintegrates such sparks, as the steam and gases are permitted, by the said obstruction, to pass upward into the chimney.

Figure 1:
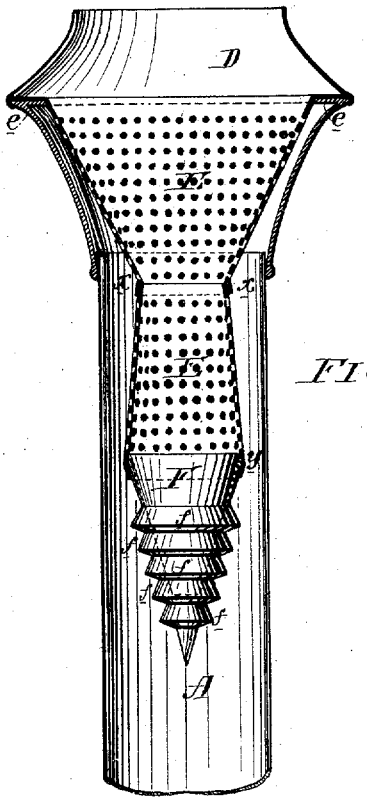
Figure 2:
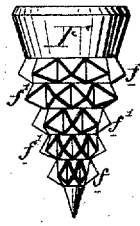

In the vertical section, Figure 1 of the accompanying drawing, A represents the chimney; F, the obstruction, situated centrally within the cylindrical portion of the chimney above the orifice of the usual petticoat-pipe, through which the exhaust steam is discharged. This obstruction, by which the passage for the steam and gases is gradually contracted, so far neutralizes the effect of the violent intermittent action of the exhaust steam as to prevent it from being the cause of extracting any but comparatively small and light particles of fuel. We prefer to so construct this obstruction that, while it gradually contracts the passage for the steam and gases up to a given point, it will serve the additional purpose of catching such sparks as may enter the screen, referred to hereafter, thereby preventing such sparks from entering the petticoat-pipe and exhaust-nozzles; hence we make the obstruction hollow, so as to receive the said sparks. We also prefer to form on the exterior of the obstruction annular ribs *f*, which present sharp edges to the sparks; or, in place of the ribs, the exterior of the obstruction may be studded with teeth *f'*, arranged as shown in the detached view, Fig. 2. Although the obstruction tends to diminish the quantity of sparks as well as their bulk, particles of ignited fuel must enter the chimney and pass the obstruction; hence, it becomes necessary to so dispose of these sparks that they cannot escape from the top of the chimney in an ignited condition. We therefore combine with the obstruction such a screen as will sift or disintegrate the sparks and render them harmless before they escape.

This screen consists, in the present instance, of the perforated casing E, connected to the top of the obstruction, above which it is carried up to a point where it is flared outwardly to conform with the flaring top of the chimney, the annular space between the latter and the screen being closed at the top, where the two are connected together by a flange.

It is essential in carrying out our invention, and to the proper action of the obstruction, for the screen to be so constructed and arranged that the passage for the escape of the steam and gases should be expanded immediately above the top of the said obstruction, for we have ascertained that the best results are attained by permitting the free expansion and escape of the steam above that point.

Particles of ignited fuel or sparks, diminished in number and bulk by the presence of the obstruction, will be projected upward into and through the annular space between the chimney and screen, and will have a tendency to escape through the perforations of the latter with the steam and gases. Many of the sparks, however, before reaching the screen, will be brought into violent contact with the obstruction, and will be thereby disintegrated and reduced to a condition which permits them to pass at once through the perforations, while other particles, in passing upward and seeking the perforations, will be triturated by contact with the screen, and being thus disintegrated will pass through the same, a few heavier particles which may fail in their efforts to penetrate the screen, striking the closed top of the annular space, and after falling a short distance being again forced upward and against the screen until they finally pass through the perforations and out of the chimney in a harmless condition. After passing through the screen some of the sparks may fall and find a temporary lodgment in the obstruction, to be soon driven therefrom by the action of the exhaust steam.

We claim as our invention—

In a locomotive-chimney, an obstruction by which the passage for the ascending steam and gases is gradually contracted, and above which the said passage is expanded, in combination with a screen by which such sparks as the obstruction permits the steam to carry upward are disintegrated, all substantially as specified.

In testimony whereof we have signed our names to this specification in the presence of two subscribing witnesses.

JACKSON RICHARDS.
JACOB MEEHL.

Witnesses:
WM. A. STEEL,
J. SHERBORNE SINGER.